2 Sheets--Sheet 1.

J. E. WORTHMAN.
Car-Brake.

No. 165,648. Patented July 13, 1875.

WITNESSES:
W. W. Hollingsworth

INVENTOR:
Jno. E. Worthman
BY
ATTORNEYS.

2 Sheets--Sheet 2.
J. E. WORTHMAN.
Car-Brake.
No. 165,648.  Patented July 13, 1875.
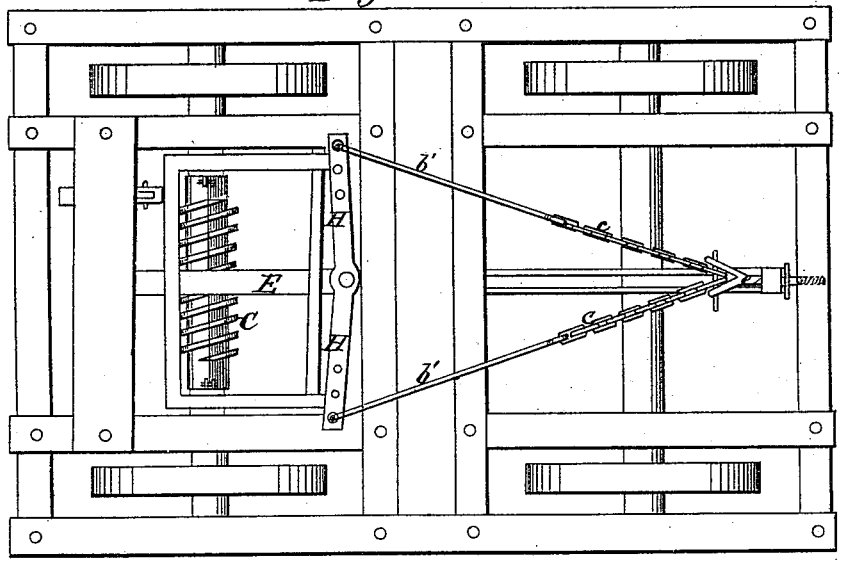
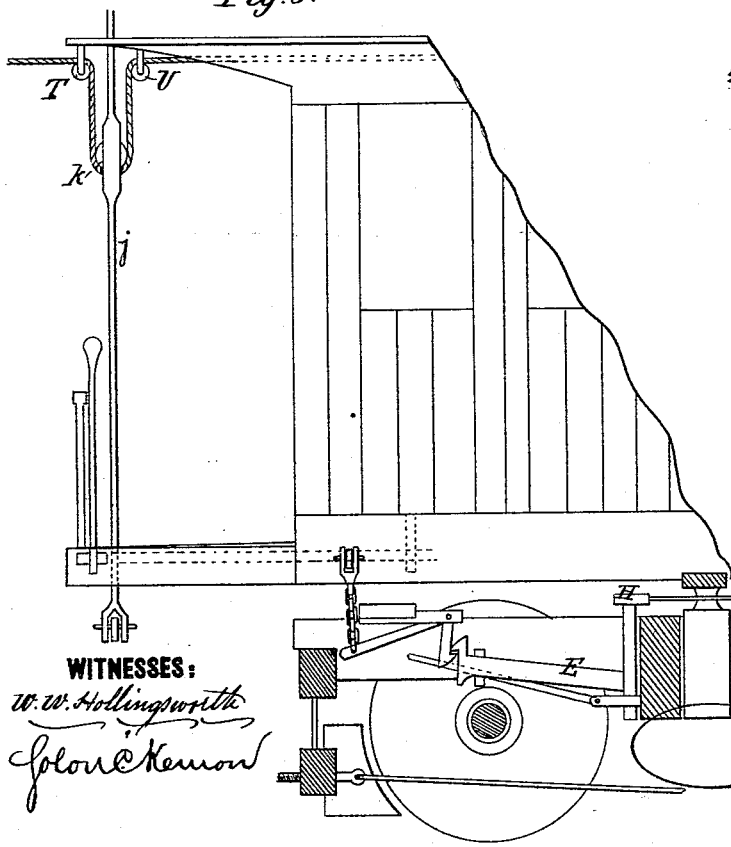
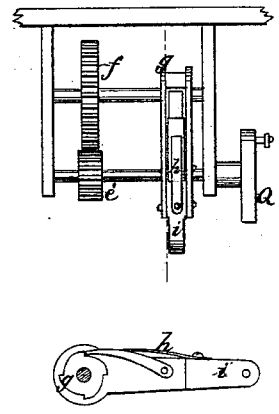
WITNESSES:
W. W. Hollingsworth
Colon E Kenon
INVENTOR:
Jno. E. Worthman
BY
ATTORNEYS.

UNITED STATES PATENT OFFICE.

JOHN E. WORTHMAN, OF MOBILE, ALABAMA.

IMPROVEMENT IN CAR-BRAKES.

Specification forming part of Letters Patent No. 165,648, dated July 13, 1875; application filed April 6, 1875.

*To all whom it may concern:*

Be it known that I, JOHN E. WORTHMAN, of the city and county of Mobile, and State of Alabama, have invented a new and Improved Car-Brake; and I do hereby declare that the following is a full, clear, and exact description of the same, reference being had to the accompanying drawing, forming a part of this specification, in which—

Figure 1:
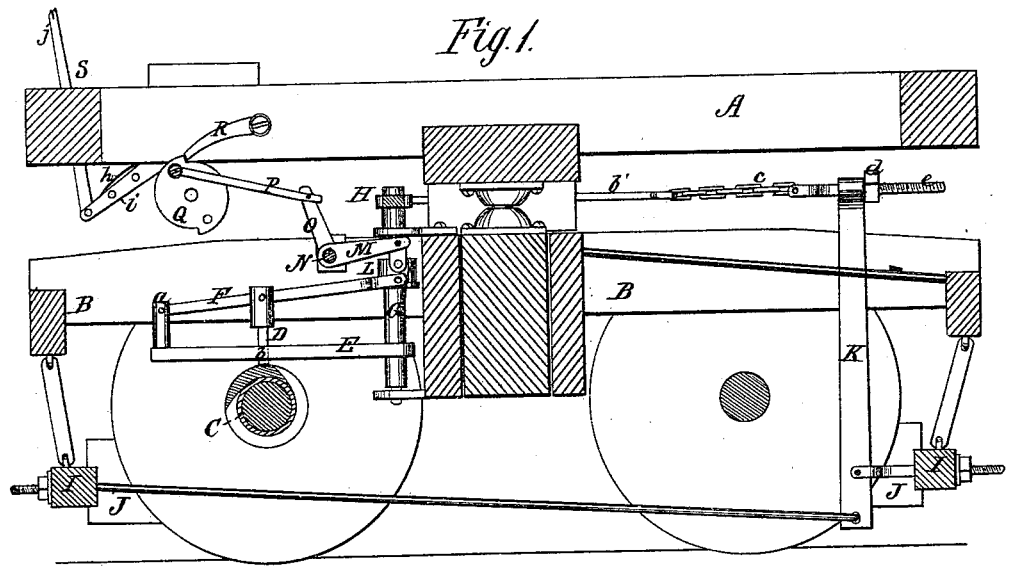
Figure 2:
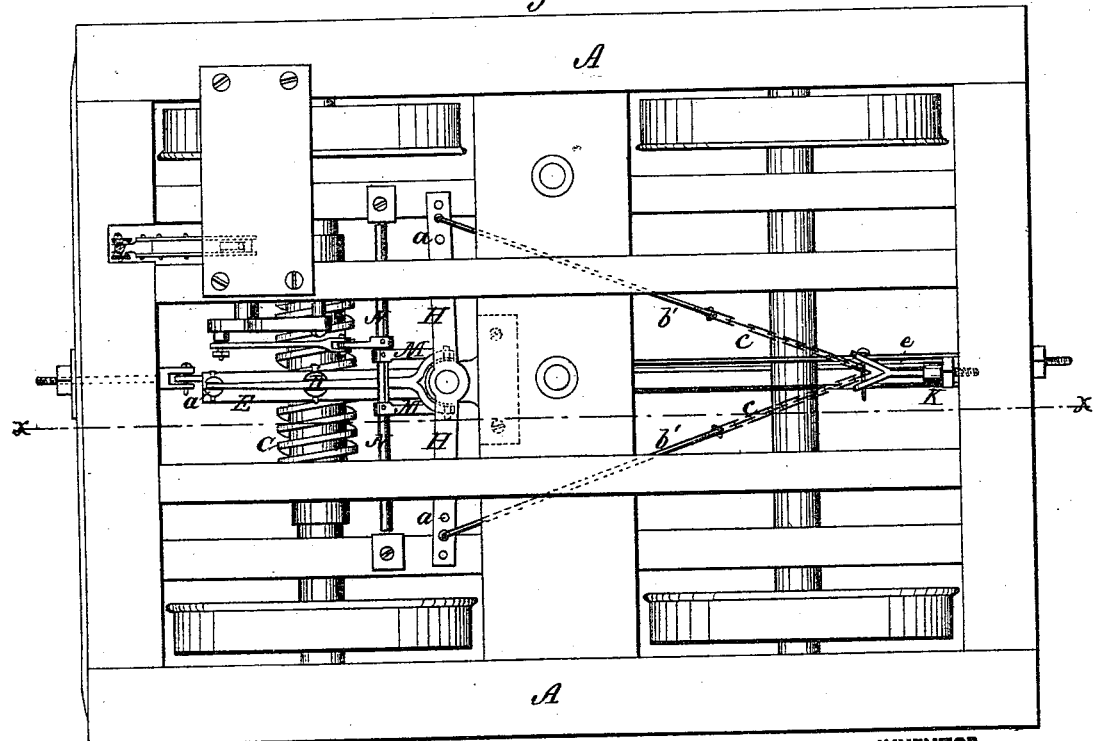

Figure 1 is a vertical section of Fig. 2 through line $x\ x$. Fig. 2 is a plan view. Fig. 3 is a detail of the devices for gearing and ungearing the pin with the worm. Fig. 4 is a plan view of a modification of my invention. Fig. 5 is a side elevation of a modification, showing also the manner of connecting all the brakes of a train.

This invention relates to certain improvements in car-brakes; and it consists in the combination, with a worm or screw-thread upon the car-wheel shaft, of an adjustable pin or tooth attached to a lever-arm provided with right-angular arms, which are connected with the traction-rod, through which the brakes are applied, the said pin being adjusted so as to be raised above the worm upon the shaft, or depressed, so as to register therewith and move the lever-arm in which it is contained laterally for the purpose of applying the brakes through the right-angular arms as elbow-levers. It also consists in the devices for operating the adjustable pin, consisting of a rock-shaft, which has an arm that is attached to a sliding collar that raises the lever carrying the pin, and a second arm, that is attached to an indented disk, so combined with a ratchet-wheel and pawl as to apply or remove the pin by the same movement.

In the drawing, A represents the bottom frame of the body of a car, and B the truck. C is a worm upon the car-axle, with which an adjustable pin, D, may be made to engage. This worm C can be cast in two parts, and bolted on the axle, as shown in the drawing. E is a lever-arm, to which is pivoted, at $a$, a vertically-moving forked lever, F, that carries the pin D, which latter slides in a hole, $b$, in lever-arm E. Said lever-arm is rigidly attached to a vertical shaft, G, pivoted in bearings in the truck; and said shaft is provided at the top with rigidly-attached arms H H, at right angles to arm E. The said arms H have perforations $a$ near the extremities, in which are adjustably fastened the rods $b'$, that connect with the brake-bars I. By adjusting these rods in the holes farther from the vertical shaft, or closer to the same, the brake-shoes J may be pressed with almost any degree of force against the wheels, and the friction so regulated as never to allow the wheels to slide upon the track and become flattened. The rods $b'$ have connecting-chains $c$, that are attached to a bifurcated bolt, $e$, which is adjustably held in the brake-lever K by a nut, $d$. L is a sliding collar moving upon the vertical shaft G, which works loosely in the fork of the lever F. Lever F carries the pin, and is also connected by means of links to the rigid arms M of a rock-shaft, N. Said rock-shaft is provided with a second arm, O, to which is attached a pitman, P. Q is a disk, having two indentations, one on each of its opposite sides, and carrying a wrist-pin, to which pitman P is attached. R is a pawl attached to the framework, which engages the indentations upon the disk. Said disk is rigidly attached to a shaft carrying a pinion, $e'$, that meshes with a second pinion, $f$, upon a shaft carrying a ratchet-wheel, $g$, which latter is operated by a setting-lever, S. This lever consists of a spring-seated pawl, $h$, a loosely-moving crank-piece, $i$, and an operating-rod, $j$, pivoted thereto. By means of this rod $j$, the pin may be made to engage with the worm, and the brakes may be readily applied; or the pin may be lifted from the worm and the brakes removed by the same movement, the gearing being so relatively proportioned that every time the rod $j$ is elevated it causes the disk Q to make a semi-revolution, in consequence of which one semi-revolution of the disk and rock of the shaft causes the lever F and the pin D to be lifted, and the alternating movement causes the same to be depressed.

I do not confine myself, however, to the devices thus described for operating the said pin, as many other good methods may be employed, and I may arrange the same to be operated by a cam movement. In the rod $j$ I place a pulley, $k$, by means of which the said rod may be operated by a rope from any part of the car; or the cars may be all connected by a single rope, and all the brakes applied by one movement, the said rope to pass through bull's-eye or fore-leader T, down around the pulley $k$ in the rod $j$, up through bull's-eye or fore-leader U, thus giving the engineer control of all the brakes throughout the train, as well as fireman, brakeman, or conductor, or any passenger, in case of danger, by pulling the brake-cord.

I am aware of the fact that it is not new to apply all of the brakes of a train simultaneously by a continuous rope or chain, and I do not claim such, broadly, but confine myself to my particular construction and arrangement of parts.

Having thus described my invention, what I claim as new is—

1. The combination, with the worm on the axle, of the lever-arm E, adjustable pin D, the right-angular arms H H, moving with the arm E, the rods $b'$, chains $c$, and the brake-lever K, substantially as and for the purpose set forth.

2. The combination of lever F, collar L, rock-shaft N, having arms M and O, the indented disk Q, connecting-rod P, pawl R, pinions $e$ and $f$, ratchet-wheel $g$, and setting-lever S, substantially as and for the purpose set forth.

3. The combination, with a continuous rope passing the entire length of the train, of the rod $j$, carrying pulley $k$, crank-piece $i$, ratchet $g$, and spring-seated pawl $h$, substantially as and for the purpose set forth.

4. The combination of the worm C, lever-arm E, right-angular arms H H, lever F, pin D, sliding collar L, rock-shaft N, arms M and O, and connecting-rod P, substantially as and for the purpose described.

JOHN E. WORTHMAN.

Witnesses:
ARCHIE CAMPBELL,
COLIN K. HUMPHRIES.